United States Patent
Wakui

(10) Patent No.: US 11,127,180 B2
(45) Date of Patent: Sep. 21, 2021

(54) IMAGE PROCESSING APPARATUS, METHOD, AND PROGRAM

(71) Applicant: FUJIFILM Corporation, Tokyo (JP)

(72) Inventor: Takashi Wakui, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/798,608

(22) Filed: Feb. 24, 2020

(65) Prior Publication Data
US 2020/0193664 A1    Jun. 18, 2020

Related U.S. Application Data

(63) Continuation of application No. PCT/JP2018/029488, filed on Aug. 6, 2018.

(30) Foreign Application Priority Data

Aug. 31, 2017   (JP) .............................. JP2017-166708

(51) Int. Cl.
    *G06T 11/60*    (2006.01)
    *G06T 5/00*    (2006.01)
    *G06T 5/50*    (2006.01)

(52) U.S. Cl.
    CPC .............. *G06T 11/60* (2013.01); *G06T 5/009* (2013.01); *G06T 5/50* (2013.01); *G06T 2207/10056* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 6,075,905 A | 6/2000 | Herman et al. | |
| 7,778,485 B2 * | 8/2010 | Zeineh ................ | G02B 21/367 382/284 |

(Continued)

FOREIGN PATENT DOCUMENTS

| | | | | |
|---|---|---|---|---|
| JP | 2005514589 A | | 5/2005 | |
| JP | 2017068302 A | * | 4/2017 | ............. H04N 5/225 |

(Continued)

OTHER PUBLICATIONS

Mircea Mujat et al., "High resolution multimodal clinical ophthalmic imaging system", Optics Express, May 24, 2010, pp. 11607-11621, vol. 18, No. 11, ISSN: 2161-2072.

(Continued)

*Primary Examiner* — Lindsay J Uhl
(74) *Attorney, Agent, or Firm* — Studebaker & Brackett PC

(57) ABSTRACT

An object of an image processing apparatus, a method, and a non-transitory computer readable recording medium storing a program is to enable acquisition of a composite image in which an effect of a meniscus formed on a liquid surface of a liquid in a container is reduced. A plurality of captured images acquired by setting a part of adjacent observation regions to overlap with each other and imaging a container a plurality of times while changing a position of the observation region are acquired. An overlapping region selection unit 51 selects the captured image having a highest contrast in the overlapping region with at least one adjacent captured image in each captured image Gi as an image of the overlapping region. A composite image generation unit 52 generates a composite image Gs by linking the plurality of captured images in which the images of the overlapping regions are selected.

6 Claims, 7 Drawing Sheets

(56) References Cited

U.S. PATENT DOCUMENTS

| | | | |
|---|---|---|---|
| 2003/0103662 | A1 | 6/2003 | Finkbeiner |
| 2017/0095152 | A1 | 4/2017 | Yates et al. |
| 2019/0113423 | A1 | 4/2019 | Goodman et al. |

FOREIGN PATENT DOCUMENTS

| | | |
|---|---|---|
| JP | 2017068302 A | 4/2017 |
| WO | 2017096248 A1 | 6/2017 |

OTHER PUBLICATIONS

The extended European search report issued by the European Patent Office dated Jul. 30, 2020, which corresponds to European Patent Application No. 18851635.5-1210 and is related to U.S. Appl. No. 16/798,608.
International Search Report issued in PCT/JP2018/029488; dated Nov. 6, 2018.
International Preliminary Report on Patentability and Written Opinion issued in PCT/JP2018/029488; dated Mar. 3, 2020.
Takashi Wakui et al., Image Analysis Method for Cultured Cells, Tissue Culture Research Communications, vol. 35, No. 1, p. 49, 2016.
An Office Action; "Notice of Reasons for Refusal," mailed by the Japanese Patent Office dated Nov. 4, 2020, which corresponds to Japanese Patent Application No. 2019-539128 and is related to U.S. Appl. No. 16/798,608 with English language translation.

\* cited by examiner

IMAGE PROCESSING APPARATUS, METHOD, AND PROGRAM

CROSS-REFERENCE TO RELATED APPLICATIONS

This application is a Continuation of PCT International Application No. PCT/JP2018/029488 filed on Aug. 6, 2018, which claims priority under 35 U.S.C. § 119(a) to Japanese Patent Application No. 2017-166708 filed on Aug. 31, 2017. Each of the above application(s) is hereby expressly incorporated by reference, in its entirety, into the present application.

BACKGROUND OF THE INVENTION

1. Field of the Invention

The present invention relates to an image processing apparatus, a method, and a non-transitory computer readable recording medium storing a program for processing a plurality of captured images acquired by relatively moving a stage on which a container accommodating an observation target is installed and an image-forming optical system forming an image of the observation target.

2. Description of the Related Art

A pluripotent stem cell such as an embryonic stem (ES) cell and an induced pluripotent stem (iPS) cell has a capability of differentiating into various tissues. The ability to apply the pluripotent stem cell to regenerative medicine, development of medication, diagnosis of disease, and the like has drawn attention.

A method of imaging the pluripotent stem cell such as the ES cell and the iPS cell, a differentiation-induced cell, or the like by a microscope or the like and evaluating a differentiation state and the like of the cell by perceiving the features of the image is suggested.

In the imaging of the cell by the microscope as described above, it is suggested that so-called tiled imaging is performed in order to acquire an image of a high magnification and a wide field of view. Specifically, for example, a method of scanning each observation region in a well by moving the stage on which a well plate is installed with respect to the image-forming optical system, imaging each observation region, and then, generating a composite image by linking the captured image of each observation region is suggested.

In addition, in the tiled imaging, adjacent observation regions are set to partially overlap with each other in order to prevent the joint between the captured images from standing out. For example, in JP2017-068302A, a method of preventing the joint from standing out by setting a part of the observation regions to overlap in the tiled imaging of the well plate and appropriately weighting the pixels of the overlapping region in the captured images is suggested.

SUMMARY OF THE INVENTION

In the cultivation of the cell using the well plate or the like, the cell and a liquid such as a cultivation liquid are accommodated in the well. It is known that a meniscus is formed on the surface of the liquid.

Particularly, in a case where the image of the cell is captured using a phase difference microscope apparatus, the effect of the meniscus on the captured image is high. Due to the effect of the meniscus, an image of a meniscus region in which the meniscus is formed has a lower contrast than a captured image of a non-meniscus region in which the meniscus is not formed. Accordingly, in the composite image generated from the captured images including the meniscus region, the evaluation of the cell cannot be performed with high accuracy especially in the meniscus region.

The present invention is conceived in view of the above matters. An object of the present invention is to enable acquisition of a composite image in which an effect of a meniscus formed on a liquid surface of a liquid in a container is reduced.

An image processing apparatus of the present invention is an image processing apparatus that processes a plurality of captured images acquired, using an imaging apparatus including a container accommodating an observation target and an imaging unit imaging the observation target in each observation region smaller than the container, by relatively moving at least one of the container or the imaging unit with respect to the other, causing a part of the adjacent observation regions to overlap, and imaging the container a plurality of times while changing a position of the observation region. The apparatus comprises an overlapping region selection unit that selects the captured image having a highest contrast in an overlapping region with at least one adjacent captured image in each captured image as an image of the overlapping region, and a composite image generation unit that generates a composite image by linking the plurality of captured images in which the images of the overlapping regions are selected.

In the image processing apparatus according to the present invention, the overlapping region selection unit may select a captured image closest to a center of the container as the image of the overlapping region.

The captured image closest to the center of the container means a captured image having the shortest distance in a case where a distance between a representative point such as a center and a centroid of the captured image and the center of the container is compared.

In the image processing apparatus according to the present invention, in a case where distances between a plurality of captured images in the overlapping region and the center of the container are the same, the overlapping region selection unit may calculate contrasts of the plurality of captured images in the overlapping region and select a captured image having the highest calculated contrast as the image of the overlapping region.

In the image processing apparatus according to the present invention, the overlapping region selection unit may calculate a contrast of the overlapping region with the at least one adjacent captured image in each captured image and select a captured image having the highest calculated contrast as the image of the overlapping region.

In this case, the overlapping region selection unit may calculate the contrast in only a region of the container in the captured image.

An image processing method according to the present invention is an image processing method of processing a plurality of captured images acquired, using an imaging apparatus including a container accommodating an observation target and an imaging unit imaging the observation target in each observation region smaller than the container, by relatively moving at least one of the container or the imaging unit with respect to the other, causing a part of the adjacent observation regions to overlap, and imaging the container a plurality of times while changing a position of the observation region. The method comprises selecting a captured image having a highest contrast in an overlapping region with at least one adjacent captured image in each captured image as an image of the overlapping region, and generating a composite image by linking the plurality of captured images in which the images of the overlapping regions are selected.

The image processing method according to the present invention may be provided as a program to be executed by a computer.

Another image processing apparatus according to the present invention comprises a memory that stores an instruction to be executed by a computer, and a processor configured to execute the stored instruction. In processing a plurality of captured images acquired, using an imaging apparatus including a container accommodating an observation target and an imaging unit imaging the observation target in each observation region smaller than the container, by relatively moving at least one of the container or the imaging unit with respect to the other, causing a part of the adjacent observation regions to overlap, and imaging the container a plurality of times while changing a position of the observation region, the processor executes a process of selecting a captured image having a highest contrast in an overlapping region with at least one adjacent captured image in each captured image as an image of the overlapping region, and generating a composite image by linking the plurality of captured images in which the images of the overlapping regions are selected.

According to the present invention, in each captured image, a captured image having the highest contrast in the overlapping region with at least one adjacent captured image is selected as the image of the overlapping region, and the composite image is generated by linking the plurality of captured images in which the images of the overlapping regions are selected. By selecting a captured image having the highest contrast in the overlapping region, the overall contrast of the composite image can be increased. Accordingly, the composite image in which the effect of a meniscus is reduced can be acquired.

DESCRIPTION OF THE PREFERRED EMBODIMENTS

Figure 1:
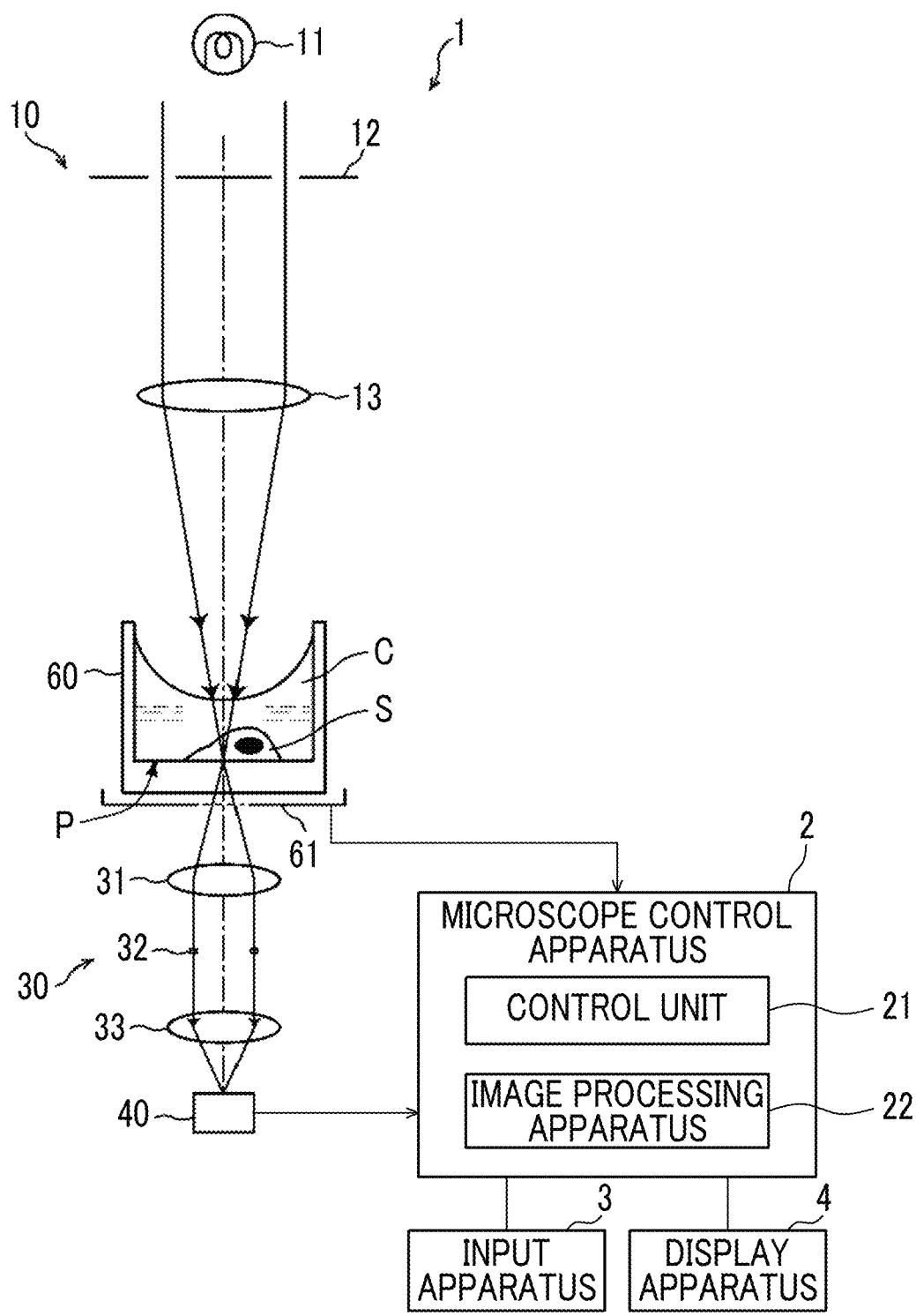
FIG. 1 is a diagram illustrating a schematic configuration of a microscope observation system to which an image processing apparatus according to one embodiment of the present invention is applied.

Hereinafter, an embodiment of the present invention will be described. FIG. 1 is a diagram illustrating a schematic configuration of a microscope observation system to which an image processing apparatus according to the embodiment of the present invention is applied. As illustrated in FIG. 1, the microscope observation system of the present embodiment comprises a microscope apparatus 1, a microscope control apparatus 2, an input apparatus 3, and a display apparatus 4. The microscope apparatus 1 corresponds to an imaging apparatus.

In the present embodiment, the microscope apparatus 1 is a phase difference microscope and, for example, as an observation target, captures a phase difference image of a cultivated cell as a captured image. Specifically, as illustrated in FIG. 1, the microscope apparatus 1 comprises an illumination light irradiation unit 10, an image-forming optical system 30, a stage 61, and an imaging unit 40.

A cultivation container 60 that accommodates an observation target S such as the cell and a cultivation liquid C is installed on the stage 61. A rectangular opening is formed at the center of the stage 61. It is configured that the cultivation container 60 is installed on a member forming the opening, and an image of the observation target S in the cultivation container 60 passes through the opening.

For example, a well plate including a plurality of wells (correspond to a container according to the embodiment of the present invention) is used as the cultivation container 60 but is not for limitation purposes. A Petri dish, a dish, or the like can be used. As the observation target S accommodated in the cultivation container 60, a pluripotent stem cell such as an iPS cell and an ES cell, cells of a nerve, a skin, myocardium, and a liver differentiation-induced from the stem cell, cells of a skin, a retina, myocardium, a blood corpuscle, a nerve, and an organ extracted from a human body, and the like are used.

The bottom surface of the cultivation container 60 installed on the stage 61 is an installation surface P of the observation target S. The observation target S is arranged on the installation surface P. The cultivation container 60 is filled with the cultivation liquid C. A concave meniscus is formed on the liquid surface of the cultivation liquid C. In the present embodiment, the cell cultivated in the cultivation liquid is used as the observation target S. However, the observation target S is not limited to the cell in the cultivation liquid. A cell fixed in a liquid such as water, formalin, ethanol, and methanol may be used as the observation target S. In this case as well, the meniscus is formed on the liquid surface of the liquid in the container.

The illumination light irradiation unit 10 irradiates the observation target S accommodated in the cultivation container 60 on the stage 61 with illumination light for so-called phase difference measurement. In the present embodiment, irradiation is performed with ring-shaped illumination light as the illumination light for phase difference measurement.

Specifically, the illumination light irradiation unit 10 of the present embodiment comprises a white light source 11 that emits white light for phase difference measurement, a slit plate 12 on which the white light emitted from the white light source 11 is incident and that emits the ring-shaped illumination light, and a condenser lens 13 on which the ring-shaped illumination light emitted from the slit plate 12 is incident and that irradiates the observation target S with the incident ring-shaped illumination light.

In the slit plate 12, a slit of a ring shape through which white light is transmitted is disposed with respect to a light screen that blocks the white light emitted from the white light source 11. The ring-shaped illumination light is formed by causing the white light to pass through the slit. The condenser lens 13 causes the ring-shaped illumination light emitted from the slit plate 12 to converge toward the observation target S.

In the cultivation container 60 installed on the stage 61, a cultivated cell group (cell colony) is arranged as the observation target S. As the cultivated cells, pluripotent stem cells such as iPS cells and ES cells, cells of a nerve, a skin, myocardium, and a liver differentiation-induced from the stem cells, cells of a skin, a retina, myocardium, a blood corpuscle, a nerve, and an organ extracted from a human body, and the like are used. As the cultivation container 60, a Petri dish, a well plate in which a plurality of wells are arranged, or the like can be used. In the present embodiment, a well plate in which a plurality of wells are arranged is used as the cultivation container 60.

The image-forming optical system 30 forms the image of the observation target S in the cultivation container 60 on the imaging unit 40 and comprises an objective lens 31, a phase plate 32, and an image-forming lens 33.

In the phase plate 32, a phase ring is formed with respect to a transparent plate that is transparent with respect to the wavelength of the ring-shaped illumination light. The size of the slit of the slit plate 12 is in a conjugate relationship with the phase ring.

In the phase ring, a phase film that shifts the phase of incident light by ¼ wavelengths, and a light reduction filter that reduces incident light are formed in a ring shape. The phase of direct light incident on the phase plate 32 is shifted by ¼ wavelengths by passing through the phase ring, and the brightness of the direct light is reduced. Meanwhile, most of diffractive light diffracted by the observation target S passes through the part of the transparent plate of the phase plate 32, and the phase and the brightness of the diffractive light are not changed.

The direct light and the diffractive light passing through the phase plate 32 are incident on the image-forming lens 33, and images of the light are formed on the imaging unit 40.

The imaging unit 40 comprises an imaging element that receives the image of the observation target S formed by the image-forming lens 33 and outputs a phase difference image as an observation image by imaging the observation target S. A charge-coupled device (CCD), an image sensor, a complementary metal-oxide semiconductor (CMOS) image sensor, and the like can be used as the imaging element.

The stage 61 is driven by a stage drive unit, not illustrated, and is moved in an X direction and a Y direction that are orthogonal in a horizontal plane. By moving the stage 61, each observation region smaller than the well in each well of the well plate is scanned, and the captured image of each observation region is acquired by the imaging unit 40. At this point, each observation region is scanned by setting a part of adjacent observation regions to overlap. The captured image of each observation region is output to the microscope control apparatus 2.

Figure 2:
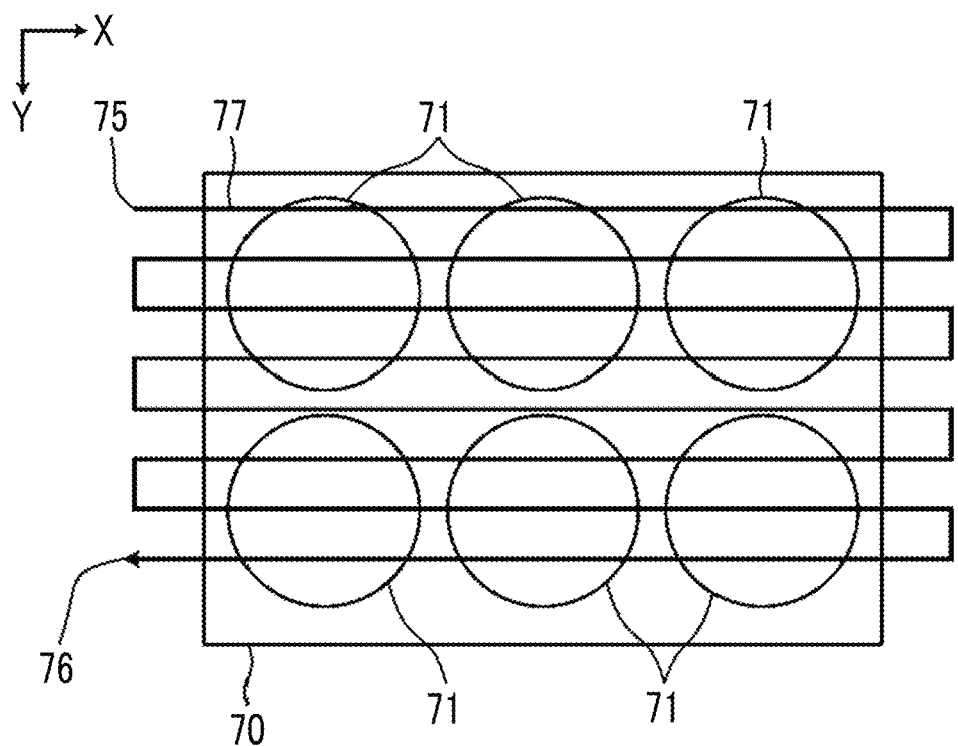
FIG. 2 is a diagram illustrating a scanning trajectory of each observation region in a well plate.

FIG. 2 is a diagram illustrating a scanning trajectory of each observation region by a solid line 77 in a case where a well plate 70 including six wells 71 is used. As illustrated in FIG. 2, each observation region of the well plate 70 is scanned along the solid line 77 from a scanning start point 75 to a scanning end point 76 by moving the stage 61 in the X direction and the Y direction.

In the present embodiment, the captured image of each observation region in the well is acquired by moving the stage 61 but is not for limitation purposes. The captured image of each observation region may be acquired by moving the image-forming optical system 30 with respect to the stage 61. Alternatively, both of the stage 61 and the image-forming optical system 30 may be moved.

The microscope control apparatus 2 is composed of a computer that comprises a central processing unit (CPU), a semiconductor memory, a hard disk, and the like. A program controlling the system including a learning program of a discriminator according to the embodiment is installed on the hard disk. The microscope control apparatus 2 controls the entire microscope observation system and comprises a control unit 21 and an image processing apparatus 22 as illustrated in FIG. 1.

The control unit 21 acquires the captured image of the observation target S by controlling driving of the illumination light irradiation unit 10, a stage drive unit (not illustrated) driving the stage 61, the image-forming optical system 30, and the imaging unit 40.

Figure 3:
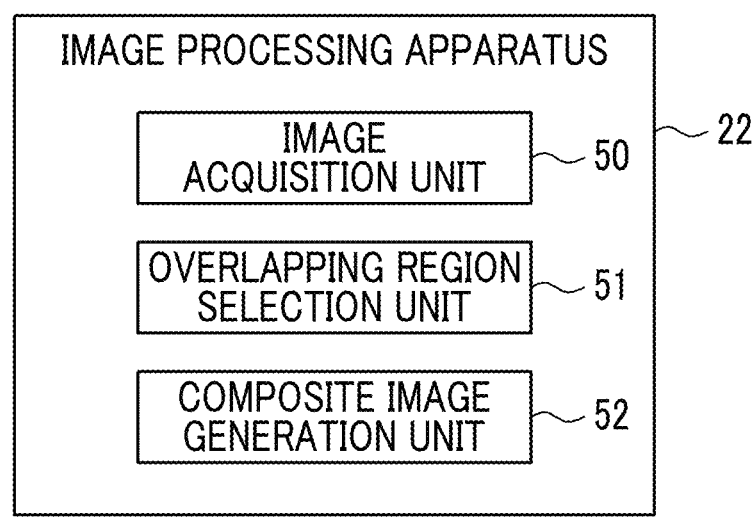
FIG. 3 is a schematic block diagram illustrating a configuration of the image processing apparatus.

The image processing apparatus 22 evaluates the state of the observation target S included in the captured image. FIG. 3 is a schematic block diagram illustrating a configuration of the image processing apparatus 22. As illustrated in FIG. 3, the image processing apparatus 22 comprises an image acquisition unit 50, an overlapping region selection unit 51, and a composite image generation unit 52.

In the present embodiment, the image processing apparatus 22 acquires the captured image of each observation region. In each captured image, the image processing apparatus 22 selects a captured image having the highest contrast in the overlapping region with at least one adjacent captured image as an image of the overlapping region, and generates a composite image by linking a plurality of captured images in which the image of the overlapping region is selected.

The image acquisition unit 50 acquires the captured image of the observation target S imaged by the imaging unit 40. In the present embodiment, the cultivation container 60 is a well plate in which a plurality of wells are arranged. Thus, the captured image of each observation region in each well is acquired.

Figure 4:
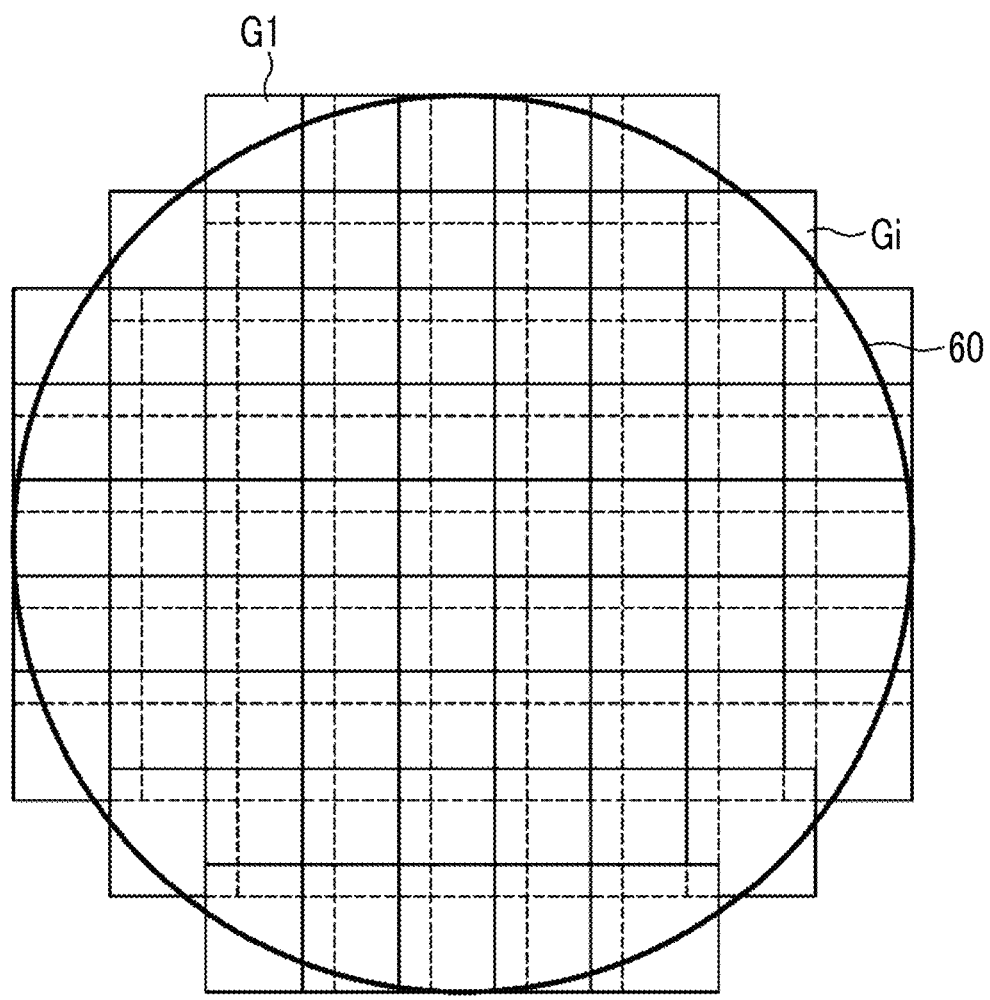
FIG. 4 is a diagram illustrating a plurality of captured images acquired with respect to a cultivation container.

In the present embodiment, as described above, each observation region is scanned by setting a part of adjacent observation regions to overlap. Thus, as illustrated in FIG. 4, in a case where the cultivation container 60 is the well plate 70, a plurality of captured images corresponding to each observation region of one well 71 are acquired. Each captured image Gi (i is the number of captured images) includes the overlapping region in overlap with the adjacent captured image. In FIG. 4, in order from the top row, captured images G1 to G5, G6 to G12, G13 to G21, G22 to G30, G31 to G39, G40 to G48, G49 to G57, G58 to G64, and G65 to G69 are acquired.

Figure 5:
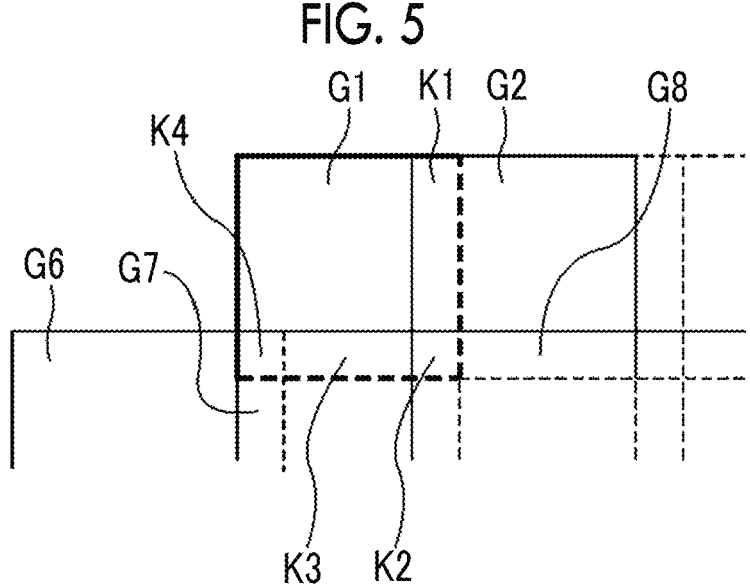
FIG. 5 is an enlarged view of a captured image at an upper left corner in FIG. 4.

An enlarged view of the captured image at the upper left corner in FIG. 4 is illustrated in FIG. 5. As illustrated in FIG. 5, the captured image G1 at the upper left corner in FIG. 4 includes an overlapping region K1 with the captured image G2 adjacent on the right side, an overlapping region K2 with the captured image G2, the captured image G7, and the captured image G8 below the overlapping region K1, an overlapping region K3 with the captured image G7 on the left side of the overlapping region K2, and an overlapping region K4 with the captured image G6 and the captured image G7 on the left side of the overlapping region K3.

In each captured image Gi, the overlapping region selection unit 51 selects a captured image having the highest contrast in the overlapping region with at least one adjacent captured image as the image of the overlapping region.

Figure 6:
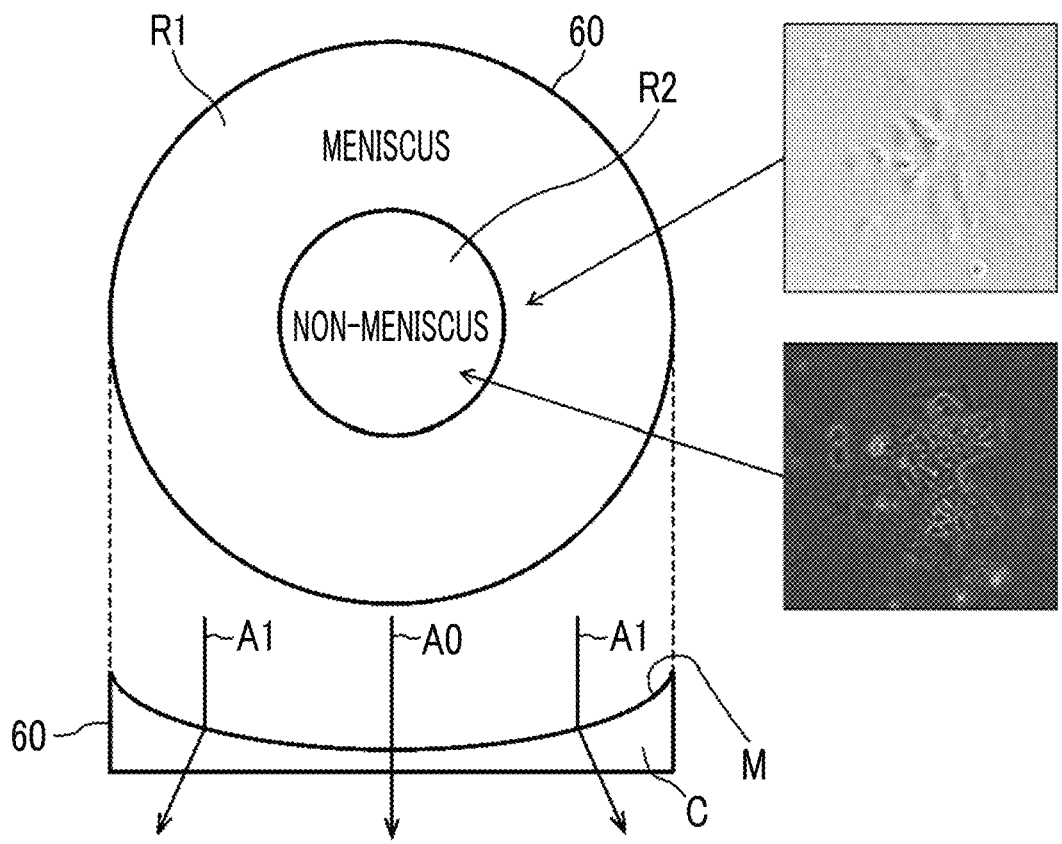
FIG. 6 is a side sectional view and a top view of the cultivation container.
Figure 7:
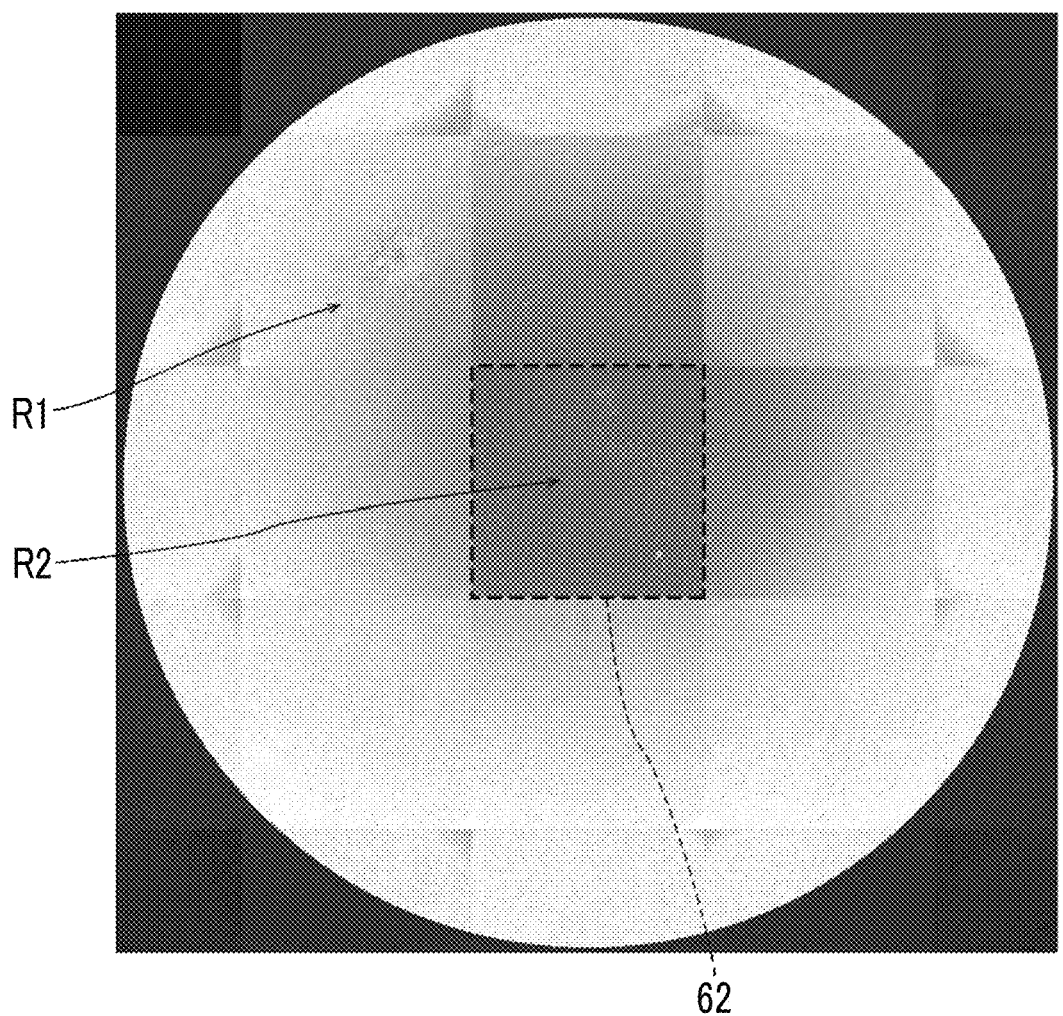
FIG. 7 is a diagram illustrating one example of a composite image in which a captured image of each observation region in the cultivation container is linked.

While the observation target S and the cultivation liquid C are accommodated in the cultivation container 60, a meniscus is formed on the liquid surface of the cultivation liquid C. FIG. 6 is a side sectional view and a top view of one well in the cultivation container 60, that is, the well plate. FIG. 7 is a diagram illustrating one example of the composite image in which the captured image of each observation region in the cultivation container 60 is linked. In FIG. 7, each region 62 divided as a rectangular region corresponds to each observation region. As described above, a part of the adjacent observation regions actually overlap. However, in FIG. 7, for description, the observation regions do not overlap. As illustrated in FIG. 6, a meniscus M is formed on the liquid surface of the cultivation liquid C in the cultivation container 60. Light that is incident from above the cultivation container 60 is refracted in a meniscus region R1 as illustrated by an arrow A1 and advances straight in a non-meniscus region R2 as illustrated by an arrow A0. Consequently, as illustrated in FIG. 6 and FIG. 7, a captured image of the non-meniscus region R2 has a high contrast, and a captured image of the meniscus region R1 has a lower contrast than the non-meniscus region R2. Accordingly, the image of each individual cell is not clearly shown in the captured image of the meniscus region R1.

The non-meniscus region R2 is formed at the center of the cultivation container 60. Thus, among the plurality of captured images Gi, as the captured image of the imaged region is positioned closer to the center of the cultivation container 60, the contrast of the captured image is increased. The case where the captured image Gi is positioned close to the center of the cultivation container 60 means that the center of the captured image Gi is close to the center of the cultivation container 60. In addition, the case where the captured image Gi is positioned close to the center of the cultivation container 60 means that the captured image Gi is positioned away from the wall surface of the cultivation container 60.

Figure 8:
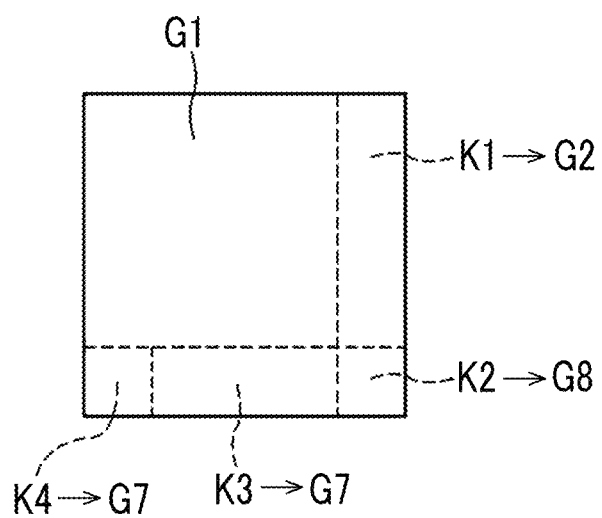
FIG. 8 is a diagram for describing one example of selection of an image in an overlapping region.

In each captured image Gi, the overlapping region selection unit 51 selects a captured image close to the center of the cultivation container 60 in the overlapping region with at least one adjacent captured image as the image of the overlapping region. For example, in the overlapping region K1 of the captured image G1 illustrated in FIG. 5, the center of the captured image G2 is closer to the center of the cultivation container 60 than the center of the captured image G1 is. Thus, the captured image G2 is selected as an image of the overlapping region K1. In the overlapping region K2, the center of the captured image G8 is closer to the center of the cultivation container 60 than the center of the captured image G2 and the center of the captured image G7 are. Thus, the captured image G8 is selected as an image of the overlapping region K2. In the overlapping region K3, the center of the captured image G7 is closer to the center of the cultivation container 60 than the center of the captured image G1 is. Thus, the captured image G7 is selected as an image of the overlapping region K3. In the overlapping region K4, the captured image G7 is closest to the center of the cultivation container 60. Thus, the captured image G7 is selected as an image of the overlapping region K4. Accordingly, in the captured image G1, the captured images G2, G8, G7, and G7 are selected for the overlapping regions K1 to K4, respectively, as illustrated in FIG. 8.

Figure 9:
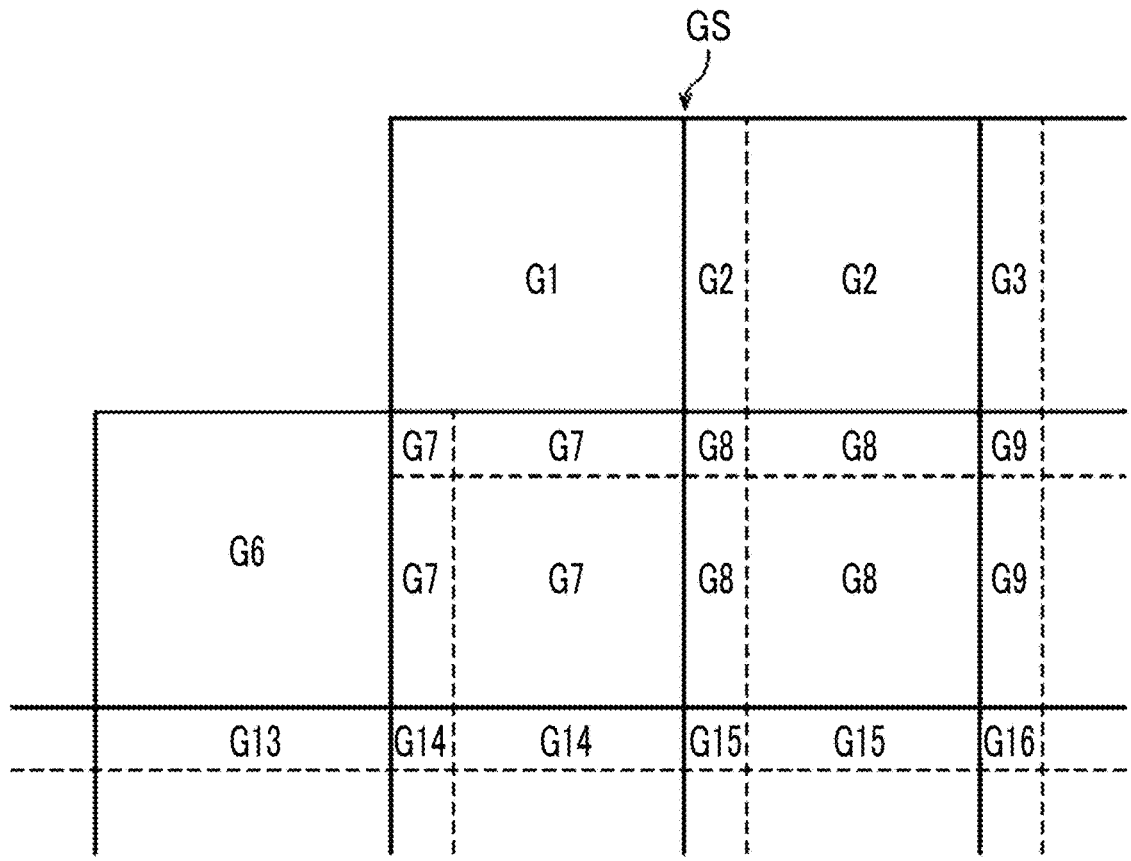
FIG. 9 is a diagram for describing generation of the composite image.

The composite image generation unit 52 generates the composite image by linking the plurality of captured images in which the images of the overlapping regions are selected. FIG. 9 is a diagram for describing the generation of the composite image. As illustrated in FIG. 9, the captured image selected by the overlapping region selection unit 51 is selected in the overlapping region of each captured image, and a composite image Gs is generated by linking the captured images and the selected images.

The input apparatus 3 comprises a mouse, a keyboard, and the like and receives various setting inputs from the user.

The display apparatus 4 displays the composite image generated by the composite image generation unit 52 and comprises, for example, a liquid crystal display. The display apparatus 4 may be composed of a touch panel and double as the input apparatus 3.

Figure 10:
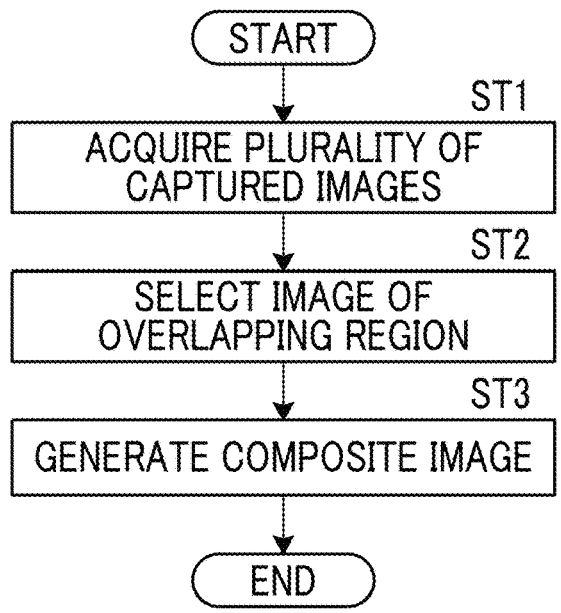
FIG. 10 is a flowchart illustrating a process performed in the present embodiment.
Figure 11:
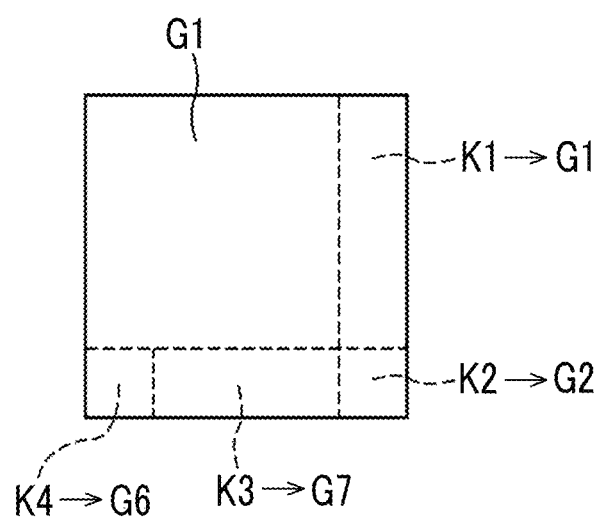
FIG. 11 is a diagram for describing another example of the selection of the image in the overlapping region.

Next, a process performed in the present embodiment will be described. FIG. 10 is a flowchart illustrating the process performed in the present embodiment. First, the image acquisition unit 50 acquires the captured image Gi of the observation target S imaged by the imaging unit 40 (step ST1). Next, in each captured image Gi, the overlapping region selection unit 51 selects a captured image having the highest contrast in the overlapping region with at least one adjacent captured image as the image of the overlapping region (step ST2). The composite image generation unit 52 generates the composite image Gs by linking the plurality of captured images Gi in which the images of the overlapping regions are selected (step ST3), and finishes the process. The generated composite image Gs is displayed on the display apparatus 4 and is used for observation.

In the present embodiment, in each captured image Gi, a captured image having the highest contrast in the overlapping region with at least one adjacent captured image is selected as the image of the overlapping region, and the composite image Gs is generated by linking the plurality of captured images in which the images of the overlapping regions are selected. By selecting the image of the captured image having the highest contrast in the overlapping region, the overall contrast of the composite image Gs can be increased. Accordingly, in the composite image Gs, the effect of the meniscus included in the captured image can be reduced.

Among the plurality of captured images acquired in the present embodiment, as the captured image is closer to the center of the container, the effect of the meniscus is decreased, and the contrast is increased. Thus, by selecting a captured image close to the center of the container as the image of the overlapping region, the image of the overlapping region is easily selected. Consequently, in the composite image Gs, the effect of the meniscus included in the captured image can be easily reduced.

In the embodiment, a captured image close to the center of the cultivation container 60 is selected as the image of the overlapping region. Alternatively, the contrast of each overlapping region with at least one adjacent captured image may be calculated, and a captured image having the highest calculated contrast may be selected as the image of the overlapping region. For example, a difference between the minimum value and the maximum value in the entire region of the captured image or a local region such as the vicinity of the center of the captured image, or the maximum value of a derivative value in the captured image can be used as the contrast. The contrast is calculated in only the region of the container in the captured image. That is, in the plurality of captured images Gi illustrated in FIG. 4, the contrast is calculated in only a region in the cultivation container 60.

In this case, in the overlapping region K1 of the captured image G1 illustrated in FIG. 5, in a case where the captured image G1 has a higher contrast, the captured image G1 is selected as the image of the overlapping region K1. In the overlapping region K2, in a case where the captured image G2 has the highest contrast, the captured image G2 is selected as the image of the overlapping region K2. In the overlapping region K3, in a case where the captured image G7 has the highest contrast, the captured image G7 is selected as the image of the overlapping region K3. In the overlapping region K4, in a case where the captured image G6 has the highest contrast, the captured image G6 is selected as the image of the overlapping region K4. Accordingly, in the captured image G1, the captured images G1, G2, G7, and G6 are selected for the overlapping regions K1 to K4, respectively, as illustrated in FIG. 8.

In a case where a captured image close to the center of the container is selected as the image of the overlapping region, the distances between the plurality of captured images in the overlapping region and the center of the container may be the same. That is, the distances between the plurality of captured images in the overlapping region and the wall surface of the container may be the same. In such a case, any captured image may be used. However, it is preferable to calculate the contrasts of the plurality of captured images in the overlapping region and select a captured image having the highest calculated contrast as the image of the overlapping region.

While the embodiment is the application of the present invention to the phase difference microscope, the present invention is not limited to the phase difference microscope and can be applied to other microscopes such as a differential interference contrast microscope and a bright field microscope.

Hereinafter, the effect of the present embodiment will be described.

Among the plurality of captured images, as the captured image is positioned closer to the center of the container, the effect of the meniscus is decreased, and the contrast is increased. Thus, by selecting a captured image close to the center of the container as the image of the overlapping region, the image of the overlapping region is easily selected. Consequently, the contrast of the composite image can be easily increased.

EXPLANATION OF REFERENCES

1: microscope apparatus
2: microscope control apparatus
3: input apparatus
4: display apparatus
10: illumination light irradiation unit
11: white light source
12: slit plate
13: condenser lens
21: control unit
22: image processing apparatus
30: image-forming optical system
31: objective lens
32: phase plate
33: image-forming lens
40: imaging unit
50: image acquisition unit
51: overlapping region selection unit
52: composite image generation unit
60: cultivation container
61: stage
62: region
70: well plate
71: well
75: scanning end point
76: scanning start point
77: solid line illustrating scanning trajectory
A0, A1: arrow
C: cultivation liquid
Gi: captured image
Gs: composite image
K1 to K4: overlapping region
M: meniscus
P: installation surface
R1: meniscus region
R2: non-meniscus region
S: observation target

What is claimed is:

1. An image processing apparatus that processes a plurality of captured images acquired, using an imaging apparatus including a container accommodating an observation target and liquid, and an imaging unit imaging the observation target in each observation region smaller than the container, by relatively moving at least one of the container or the imaging unit with respect to the other, causing a part of the adjacent observation regions to overlap, and imaging the container a plurality of times while changing a position of the observation region, the apparatus comprising a processor configured to:
   acquire the captured image which is captured using illumination light irradiated to the observation target and a liquid surface of the liquid accommodated in the container,
   select, based on a distance from a wall of the container, the captured image closest to a center of the container in an overlapping region with at least one adjacent captured image in each captured image as an image of the overlapping region; and
   generate a composite image by linking the plurality of captured images in which the images of the overlapping regions are selected.

2. The image processing apparatus according to claim 1, wherein in a case where distances between a plurality of captured images in the overlapping region and the center of the container are the same, the processor calculates contrasts of the plurality of captured images in the overlapping region and selects the captured image having the highest calculated contrast as the image of the overlapping region.

3. The image processing apparatus according to claim 1, wherein the processor calculates a contrast of the overlapping region with the at least one adjacent captured image in each captured image and selects the captured image having the highest calculated contrast as the image of the overlapping region.

4. The image processing apparatus according to claim 3, wherein the processor calculates the contrast in only a region of the container in the captured image.

5. An image processing method of processing a plurality of captured images acquired, using an imaging apparatus including a container accommodating an observation target and liquid, and an imaging unit imaging the observation target in each observation region smaller than the container, by relatively moving at least one of the container or the imaging unit with respect to the other, causing a part of the adjacent observation regions to overlap, and imaging the container a plurality of times while changing a position of the observation region, the method comprising:

acquiring the captured image which is captured using illumination light irradiated to the observation target and a liquid surface of the liquid accommodated in the container, selecting, based on a distance from a wall of the container, a captured image closest to a center of the container in an overlapping region with at least one adjacent captured image in each captured image as an image of the overlapping region; and generating a composite image by linking the plurality of captured images in which the images of the overlapping regions are selected.

6. A non-transitory computer readable recording medium storing an image processing program causing a computer to execute an image processing method of processing a plurality of captured images acquired, using an imaging apparatus including a container accommodating an observation target and liquid, and an imaging unit imaging the observation target in each observation region smaller than the container, by relatively moving at least one of the container or the imaging unit with respect to the other, causing a part of the adjacent observation regions to overlap, and imaging the container a plurality of times while changing a position of the observation region, the program causing the computer to execute:

a procedure of acquiring the captured image which is captured using illumination light irradiated to the observation target and a liquid surface of the liquid accommodated in the container, a procedure of selecting, based on a distance from a wall of the container, a captured image closest to a center of the container in an overlapping region with at least one adjacent captured image in each captured image as an image of the overlapping region; and a procedure of generating a composite image by linking the plurality of captured images in which the images of the overlapping regions are selected.

* * * * *